United States Patent Office 3,733,410
Patented May 15, 1973

3,733,410
ELIXIRS WITH ACID ADDITION SALTS OF THERAPEUTICALLY ACTIVE ORGANIC BASES AS ACTIVE SUBSTANCES
Henning Asche, Riehen, Basel, Switzerland, assignor to Ciba-Geigy A.G., Basel, Switzerland
No Drawing. Filed Jan. 6, 1970, Ser. No. 1,059
Claims priority, application Switzerland, Jan. 29, 1969, 1,335/69
Int. Cl. A61k 27/00
U.S. Cl. 424—232
11 Claims

ABSTRACT OF THE DISCLOSURE

Elixirs containing the monosodium pamoate of a therapeutically active organic base and other pharmaceutically acceptable additives have improved properties.

DETAILED DESCRIPTION

The present invention relates to elixirs containing acid addition salts of therapeutically applicable organic bases as active substances and which, with regard to taste, physiological side effects as well as physical and chemical stability, possess improved properties.

It is known that organic bases, applicable as medicaments, of which the water-soluble dissociating salts such as, e.g. the hydrochlorides, have a bitter taste and which frequently also exhibit, when taken orally, a local anaesthetic effect, combine with 4,4'-methylene-bis-(3-hydroxy-2-naphthoic acid)—hereinafter referred to as pamoic acid—to form salts which are difficultly soluble in water and which, in the case of oral administration, are practically tasteless. Such salts—hereinafter referred to as pamoates—are obtained, e.g. by the reaction of disodium pamoate with twice the molar amount of the hydrochloride, or with the corresponding amount of a polyhydrochloride of the organic base desired as the component. The obtained pamoates are easily split by acids and alkalis, so that release of the organic bases from which they are derived for absorption in the intestinal tract is generally good. Pamoates have been used not only as active substances in medicaments made up in dosage unit forms, but also in syrups comprising aqueous suspension of pure pamoates together with usual additives such as sorbitol and glycerin. Such syrups provide not only an improvement with regard to taste, but also, by virtue of the insolubility of the pamoates in water, an increased stability of the bases used as active ingredient. As a suspension, however, such syrups carried with them the danger of sedimentation and correspondingly inaccurate dosage control.

The very first producers of pamoates of organic bases (W. Schulemann et al., U.S. Pat. No. 1,872,826) observed their solubility in organic solvents such as ethanol, acetone and methanol. The solubility, however, e.g. in aqueous ethanol, rapidly decreases with increasing water content. In alkene polyols containing the maximal possible number of hydroxyl groups, such as glycerin and sorbitol, the solubility of pamoates of organic bases is very low. In other alkane polyols, such as 1,2-propanediol, it is somewhat higher, but still far lower than in ethanol. In the above mentioned U.S. Patent the possibility of producing acidic salts instead of neutral salts of pamoic acid with organic bases was also mentioned. Subsequently, however, the more difficultly water-soluble neutral pamoates of organic bases became of far greater interest, in view of the purposes fulfilled thereby, than the acidic pamoates.

Surprisingly, it has now been found that tastewise satisfactory and physically and chemically stable elixirs can be made by utilising the therapeutically active base in the form of its addition salt with the acidic monosodium salt of pamoic acid. Such addition salts are also called and hereinafter referred to as monosodium pamoates of organic bases. The elixirs of the present invention comprise such monosodium pamoate of an organic base in an amount sufficiently high to be suitable for therapeutic administration. Simultaneously the ethanol which the elixir by definition must contain can be present in an advantageously low and pharmacologically unobjectionable amount. The monosodium pamoate of the organic base either can be added to a mixture of the liquid ingredients of the elixir and dissolved or it can be formed in situ in said liquids or in portions thereof. The mixture of the liquid ingredients comprises about 10–20% (weight/volume) of ethanol; about 75–15% of one or more aliphatic polyols, up to a maximum of about 25% of 1,2- propanediol, being counted as a part of said aliphatic polyol, and water to fill up to 100%. The mixture can also contain sugar and sodium salicylate in amounts defined below. The previously preferred neutral pamoates of organic bases, e.g. salts of pamoic acid, gave, after analogous processing, elixirs having either an inadequate physical stability or too low an active substance concentration.

More particularly, in accordance with the foregoing, the elixirs of the present invention comprise, per 100 ml., (a) The monosodium pamoate of a pharmaceutically acceptable, therapeutically active organic base, in an amount corresponding to from 0.1 to 1 g. of a common pharmaceutically acceptable acid addition salt of said base;

(b) Ethanol, in an amount of from 10 to 20 g.;

(c) an aliphatic polyol and/or sugar in an amount of from 75 to 15 g.;

(d) 1,1-propanediol, in an amount up to 25 g., being counted as a part of said aforementioned portion of aliphatic polyol and/or sugar;

(e) Sodium salicylate, in an amount of up to 5 g., whereby the 0.4-fold amount of said 1,2 propanediol, when present, is at least 3 g.; and (f) Water, in an amount as to fill up the elixir to 100 ml.

Preferably the elixirs according to the present invention contain the monosodium pamoate of an organic base in an amount corresponding to from 0.2 to 0.6 g. of a normal pharmaceutically acceptable acid addition salt thereof.

It will be understood that such elixirs may optionally also include minor amounts of flavouring agents and aromatics, antioxidants and other usual additives.

The elixirs, according to the invention, exhibit no local anaesthetic effects. At the same time, the chemical stability of the organic bases, present as salt components, in the elixirs according to the invention is substantially better than, for example, aqueous solutions of the hydrochlorides. This indicates that in the elixirs of the present invention, the pamoates are predominantly dissolved as single, molecular units.

It is possible to use in the elixirs of the present invention, widely diverse therapeutically active organic bases as components of the employed sodium pamoates. The invention is however of especial interest in its application to such bases, the taste and pharmacological properties of which and/or their relatively low stabliity, render difficult, or impossible, the preparation of known elixir forms. The monosodium pamoates to be used can be produced either separately, e.g. by combining the aqueous solutions of disodium pamoate and the hydrochloride of the desired base, or in situ in the subject compositions. In the latter case, for example, the solution of a normally pharmacologically acceptable acid addition salt of the desired base in one portion of the elixir components, and a solution of the amount of disodium pamoate, necessary for the formation of the desired monosodium pamoate, in another portion of the elixir components, preferably in water, are added together.

Suitable components of the monosodium pamoates are, e.g. bases having antitussive, analgesic, spasmolytic, sedative, antibacterial, antiviral or antiprotozoal properties.

Of special importance, as components of monosodium pamoates of elixirs, according to the invention, are organic bases containing a tricyclic ring system with a monoacidic or diacidic basic group bound to its middle ring. Such bases are, in particular, medicaments being applicable for the treatment of states of agitation, fear and tension, e.g. the 10-[2-(1-methyl-2-piperidyl)-ethyl]-2-(methylthio)-phenothiazine (Thioridazine, notation according to Chemical Abstracts), as well as medicaments having predominantly antidepressive effectiveness, such as 5-[3-dimethylamino)-propyl]-10,11-dihydro-5H-diebenz [b,f]azepine (Imipramine), 5-[3-(methylamino)-propyl]-10,11-dihydro-5H-dibenz [b,f]azepine (Desipramine), 3-chloro-5-[3-(dimethylamino)-propyl]-10,11-dihydro-5H-dibenz[b,f]azepine (Clomipramine), 5-[3-(dimethylamino)-propyl]-5,11-dihydro-10H-dibenz [b,f]azepin-10-one (Ketipramine), 4-[3-(5H-dibenz[b,f]azepine-5-yl)-propyl]-1-piperazine-ethanol (Opipramol), as well as N,N-dimethyl-10,11-dihydro-5-H-dibenzo[a,d] cyclohepten-$\Delta^{5,\gamma}$-ylpropylamine (Amitriptyline) and also, e.g. antiallergics, spasmolytics or antitussives such as, e.g. the N-butyl-N-[2-(dimethylamino)-ethyl]-5H-dibenz[b,f] azepine-5-carboxamide hydrochloride.

The concentration of the bases, or of their monosodium pamoates, is so designed that a single dose is contained in the usually administered content of a measuring spoon, e.g. 5 millilitres, or, if necessary, in twice or three times the volume. In order to facilitate the comparison with and the reference to other forms of administration, and because the monosodium pamoates are often advantageously produced in situ from other acid addition salts, the active substance concentrations and their limits of 0.1% to 1% are related above to the normal therapeutically applicable acid addition salts. Depending on the molecular weight and valency of the bases and of the acids present in the salts being used as reference substances, the corresponding amounts of monosodium pamoates are, in general, about two to three times as great as the amounts of the therapeutically usual acid addition salts, e.g. of the hydrochlorides, fumarates, tartrates and the like. The concentrations of the monosodium pamoates of therapeutically applicable organic bases are thus mostly between ca. 0.2% and 3%, and preferably between 0.4% and 1.5%.

An ethanol content which is at the upper limit of the stated range of 10–20% is, for many active substances and the patient groups to be treated therewith, sufficiently low and enables the content of 1,2-propanediol and/or sodium salicylate to be fixed low within the given range. On the other hand, it is possible and desirable to lower the ethanol content to 10–15%, if the active substances to be dissolved, in themselves, increase the effect of the alcohol and/or if the elixirs are for administration to particularly alcohol-sensitive patient groups, e.g. to children.

Suitable aliphatic polyols are, in particular, alkenepolyols such as glycerin, sorbitol as well as mixtures of these with each other and/or with 1,2-propanediol up to the stated maximum amount of the latter, as well as polyethylene glycols with molecular weights up to ca. 1000. The sorbitol is used, for example, in the usual 70% commercial form (weight/weight), whereby the water contained therein has to be calculated as part of the total water content of the elixir. Suitable as sugar are, in particular, mono- and oligosaccharides such as, e.g. glucose, invert sugar or unrefined sugar.

As can be deduced from the above statements, the sodium salicylate need not be present if at least 7.5% (weight/volume) of 1,2-propanediol is contained. Alternatively, the 1,2-propanediol is unnecessary if the content of sodium salicylate is at least 3% (weight/volume). Where, however, the lowest possible ethanol content is desired then both 1,2-propanediol and sodium salicylate are advantageously used as components of the elixir, the amounts increasing, as already mentioned as the ethanol content is decreased. The proportions of 1,2-propanediol and/or sodium salicylate are also increased if the active substance content, within the stated range, is fixed relatively high.

Furthermore, the elixirs, according to the invention, may also contain normal additives for improving their taste and smell, as well as to increase the stability of the active substances. For example, sodium saccharin commercial aromatics as well as antioxidants such as, e.g. sodium sulphite or ascorbic acid, can be added.

The following examples illustrate some embodiments of the invention, but they in no way limit the scope of the invention.

EXAMPLE 1

(a) One litre of an elixir having a content of monosodium pamoate of Imipramine (abbreviated scientific term for 5-[3-)dimethylamino)-propyl]-10,11-dihydro-5-H-dibenz[b,f]azepine) corresponding to 0.5% of Imipramine-hydrochloride, is produced by adding to a solution of 1.0 g. sodium sulphite and 0.50 g. of saccharine-sodium salt in 50 g. of distilled water, 200 g. of ethanol and 5.000 g. of Imipramine-hydrochloride. After solution has occurred, 300 g. of glycerin, 150 g. of molasses Pharmacopoe Helvetica (64% weight/weight), 200 g. of 1,2-propanediol and 45.00 g. of sodium salicylate are added and the mixture is stirred to obtain complete solution. A solution of 6.83 g. of disodium pamoate in 50 g. of distilled water is added, whilst stirring is performed, to the solution of Imipramine-hydrochloride, whereby a clear mixture is obtained. After addition of 0.5 g. of vermouth-aroma, the volume is made up with distilled water to one litre. The obtained elixir is a clear liquid having a pH-value of 8.4.

In an analogous manner, elixirs are produced with the same active substance, using the following substances for 100 ml.:

| | (b) | (c) | (d) |
|---|---|---|---|
| Imipramine-hydrochloride, grams | 0.500 | 0.500 | 0.500 |
| Disodium pamoate, grams | 0.683 | 0.683 | 0.683 |
| Glycerin, grams | 30.00 | 30.00 | 7.50 |
| Sorbitol 70% (W/W), grams | 15.00 | 20.00 | |
| 1,2-propanediol, grams | 25.00 | 25.00 | 25.00 |
| Ethanol, grams | 17.50 | 15.00 | 20.00 |
| Sodium salicylate, grams | 3.000 | 3.500 | 5.000 |
| Sodium saccharinate, grams | 0.050 | 0.050 | 0.050 |
| Sodium sulphite, grams | 0.100 | 0.100 | 0.100 |
| Aroma | q.s. | q.s. | q.s. |
| Distilled water | (1) | (1) | (1) |
| pH-value of the obtained elixir | 8.3 | 8.2 | 8.4 |

[1] Add 100.0 ml.

EXAMPLE 2

(a) 100.0 ml. of an elixir having a content of bis-monosodium pamoate of Opipramol (abbreviated scientific term for 4-[3-(5H-dibenz[b,f]azepin-5 - yl)-propyl]-1-piperazine-ethanol) corresponding to 0.5% of Opipramol-dihydrochloride, are produced by dissolving 0.500 g. of this dihydrochloride as well as 0.050 g. of sodium saccharinate and 0.100 g. of sodium sulphite in 12.0 g. of distilled water, and then adding 20.0 g. of glycerin, 15.0 g. of sorbitol (70%), 25.0 g. of 1,2-propanediol, 15.0 g. of ethanol and 3.000 g. of sodium salicylate. After stirring in a solution of 0.991 g. of disodium pamoate in 15.964 g. of distilled water and 0.01 g. of lemon-aroma and 0.004 g. of "Halb und Halb-Essenz" (Firma Haarmann und Reimer, Holzminden, Federal Republic Germany), 100.0 ml. of elixir are obtained as a clear solution having a pH-value of 5.8.

Elixirs are obtained, in an analogous manner, from the following components:

|  | (b) | (c) |
|---|---|---|
| Opipramol-dihydrochloride, grams | 0.500 | 0.500 |
| Disodium pamoate, grams | 0.911 | 0.911 |
| Glycerin, grams | 30.00 | 30.00 |
| Sorbitol (70%) (W/W), grams | 20.00 | 20.00 |
| 1,2-propanediol, grams | 20.00 | 25.00 |
| Ethanol, grams | 20.00 | 15.00 |
| Sodium salicylate, grams | 3.500 | 2.500 |
| Sodium saccharinate, grams | 0.050 | 0.050 |
| Sodium sulphite, grams | 0.100 | 0.100 |
| Aroma | q.s. | q.s. |
| Distilled water | (1) | (1) |
| pH-value of this elixir is | 5.8 | 5.5 |

[1] Add 100.0 ml.

EXAMPLE 3

Analogously to Examples 1 and 2, elixirs are produced having an active substance content corresponding to 0.5% of Clomipramine-hydrochloride (abbreviated scientific term for 3-chloro-5-[3-(dimethylamino)-propyl] - 10,11 - dihydro-5H-dibenz[b,f]azepine-hydrochloride) from the following components:

|  | (a) | (b) | (c) |
|---|---|---|---|
| Clomipramine-hydrochloride, gram | 0.500 | 0.500 | 0.500 |
| Disodium pamoate, gram | 0.620 | 0.620 | 0.620 |
| Glycerin, gram | 20.00 | 30.00 | 30.00 |
| Sorbitol (70%) (W./W.), gram | 15.00 | 20.00 | 20.00 |
| 1,2-propanediol, gram | 25.00 | 20.00 | 25.00 |
| Ethanol, gram | 17.50 | 20.00 | 15.00 |
| Sodium salicylate, gram | 3.000 | 3.500 | 3.000 |
| Sodium saccharinate, gram | 0.050 | 0.050 | 0.050 |
| Sodium sulphite, gram | 0.100 | 0.100 | 10.00 |
| Aroma | q.s. | q.s. | q.s. |
| Distilled water | (1) | (1) | (1) |
| pH-value of the obtained elixir | 8.3 | 8.3 | 8.3 |

[1] Add 100.0 ml.

EXAMPLE 4

Analogously to Examples 1 and 2, elixirs are produced having an active substance content corresponding to 0.5% of Ketipramine hydrogen fumarate (abbreviated scientific term for 5-[3-(dimethylamino)-propyl] - 5,11 - dihydro-10H-dibenz[b,f]azepin-10-one-hydrogen fumarate) from the following components:

|  | (a) | (b) |
|---|---|---|
| Ketipramine hydrogen fumarate, grams | 0.500 | 0.500 |
| Disodium pamoate, grams | 0.527 | 0.527 |
| Glycerin, grams | 40.00 | 40.00 |
| Sorbitol, (70%) (W./W.), grams | 20.00 | 20.00 |
| 1,2-propanediol, grams | 12.00 |  |
| Ethanol, grams | 15.00 | 15.00 |
| Sodium salicylate, grams |  | 4.000 |
| Sodium saccharinate, grams | 0.050 | 0.050 |
| Sodium sulphite, grams | 0.100 | 0.100 |
| Aroma | q.s. | q.s. |
| Distilled water | (1) | (1) |
| pH-value of the obtained elixir | 5.5 | 5.75 |

[1] Add 100.0 ml.

EXAMPLE 5

Analogously to Examples 1 and 2, elixirs having an active substance content corresponding to 0.4% of Ketipramine hydrogen fumarate are produced from the following components:

|  | (a) | (b) |
|---|---|---|
| Ketipramine hydrogen fumarate, grams | 0.400 | 0.400 |
| Disodium pamoate, grams | 0.422 | 0.422 |
| Glycerin, grams | 40.00 | 40.00 |
| Sorbitol 70% (W./W.), grams | 20.00 | 20.00 |
| 1,2-propanediol, grams |  | 7.50 |
| Ethanol, grams | 20.00 | 20.00 |
| Sodium salicylate, grams | 3.000 |  |
| Sodium saccharinate, grams | 0.050 | 0.050 |
| Sodium sulphite, grams | 0.100 | 0.100 |
| Aroma | q.s. | q.s. |
| Distilled water | (1) | (1) |
| pH-value of the obtained elixir | 5.3 | 5.0 |

[1] Add 100.0 ml.

EXAMPLE 6

Analogously to Examples 1 and 2, elixirs having an active substance content corresponding to 0.5% [cp. (a)] or 0.2% [cp. (b)] of Thioridazine hydrochloride (abbreviated scientific term for 10 - [2 - (1 - methyl-2-piperidyl) - ethyl] - 2 - (methylthio) - phenothiazine hydrochloride, notation according to Chemical Abstracts) are produced from the following components:

|  | (a) | (b) |
|---|---|---|
| Thioridazine hydrochloride, grams | 0.500 | 0.200 |
| Disodium pamoate, grams | 0.530 | 0.212 |
| Glycerin, grams | 20.00 | 30.00 |
| Sorbitol 70% (W./W.), grams | 30.00 | 20.00 |
| 1,2-propanediol, grams | 25.00 | 15.00 |
| Ethanol, grams | 20.00 | 20.00 |
| Sodium salicylate, grams | 5.000 | 3.000 |
| Sodium saccharinate, grams | 0.050 | 0.050 |
| Sodium sulphite, grams | 0.100 | 0.100 |
| Aroma | q.s. | q.s. |
| Distilled water | (1) | (1) |
| pH-value of the obtained elixir | 8.10 | 7.3 |

[1] Add 100.0 ml.

EXAMPLE 7

Analogously to Examples 1 and 2, elixirs having an active substance content corresponding to 0.5% of the antitussive N - butyl-N-[2-(dimethylamino)-ethyl]-5H-dibenz[b,f]azepine-5-carboxamide - hydrochloride are produced from the following components:

|  | (a) | (b) | (c) |
|---|---|---|---|
| Above stated active substance, grams | 0.500 | 0.500 | 0.500 |
| Disodium pamoate, grams | 0.596 | 0.956 | 0.596 |
| Glycerin, grams |  |  | 20.00 |
| Sorbitol 70% (W./W.), grams |  |  | 30.00 |
| 1,2-propanediol, grams | 15.00 | 25.00 | 10.00 |
| Ethanol, grams | 20.00 | 20.00 | 15.00 |
| Sodium salicylate, grams | 5.000 | 5.000 | 4.000 |
| Sodium saccharinate, grams | 0.025 | 0.025 | 0.025 |
| Sodium cylamate, grams | 0.200 | 0.200 | 0.200 |
| Aroma | q.s. | q.s. | q.s. |
| Distilled water | (1) | (1) | (1) |
| pH-value of the obtained elixir | 7.35 | 7.4 | 7.14 |

[1] Add 100.0 ml.

What we claim is:

1. As an elixir, a clear solution, containing per 100 ml,
   (a) a tasteless monosodium pamoate of a pharmaceutically acceptable, therapeutically active otherwise bitter tasting tricyclic organic base containing a monoacidic or diacidic basic group bound to the middle ring thereof, in an amount corresponding to from 0.1 to 1 g. of the hydrochloric acid addition salt of the base,
   (b) 10 to 20 g. of ethanol,
   (c) 15 to 75 g. of an aliphatic polyol, a sugar or mixture thereof,
   (d) from 0 up to 25 g. of 1,2-propanediol, counted as a part of component c,
   (e) sodium salicylate, in an amount of from 0 up to 5 g., whereby the 0.4-fold amount of the 1,2-propanediol, when present, is at least 3 g., and
   (f) water in an amount sufficient to make 100 ml. of elixir, with the provisos that if the elixir does not contain sodium salicylate the 1,2-propanediol be present in an amount of at least 7.5 g. and if the elixir does not contain 1,2 propanediol the sodium salicylate be present in an amount of at least 3 g.

2. An elixir according to claim 1, wherein the organic base is 5-[3-(dimethylamino)-propyl] - 10,11 - dihydro-5H-dibenz[b,f]azepine.

3. An elixir according to claim 2 wherein the organic base is present in an amount corresponding to from 0.1 to 1% of the hydrochloride thereof.

4. An elixir according to claim 1, wherein the organic base is 3-chloro-5-[3-(dimethylamino)-propyl]-10, 11-dihydro-5H-dibenz[b,f]azepine.

5. An elixir according to claim 4, wherein the organic base is present in an amount corresponding to 0.1 to 1% of the hydrochloride thereof.

6. An elixir according to claim 1, wherein the organic base is 4-[3-(5H-dibenz[b,f]azepine-5-yl) - propyl] - 1-piperazine-ethanol.

7. An elixir according to claim 6, wherein the organic base is present in an amount corresponding to 0.1 to 1% of the dihydrochloride thereof.

8. An elixir according to claim 1, wherein the organic base is 5-[3-(dimethylamino)-propyl] - 5,11 - dihydro-10H-dibenz[b,f]azepin-10-one.

9. An elixir according to claim 8, wherein the organic base is present in an amount corresponding to 0.1 to 1% of the fumarate thereof.

10. An elixir according to claim 1, wherein the organic base is N-butyl-N-[2-(dimethylamino)-ethyl] - 5H - dibenz[b,f]azepine-5-carboxamide.

11. An elixir according to claim 10, wherein the organic base is present in an amount corresponding to 0.1 to 1% of the hydrochloride thereof.

References Cited

UNITED STATES PATENTS

| 3,123,529 | 3/1964 | Kariss et al. | 424—230 |
| 3,238,103 | 3/1966 | Vogenthaler | 424—230 |
| 3,326,896 | 6/1967 | Holstius | 260—239 |

FOREIGN PATENTS

| 1,461,407 | 12/1966 | France. |

OTHER REFERENCES

Wilson et al., American Drug Index, 1968, pp. 222 (Elavil), 241 (Etrafon), 363 (Mellaril), 420 (Norpramin), 430 (Opi Pramol), 466 (Pertofrane), 623 (Tofranil), published by J. B. Lippincott, Philadelphia, Pa.

Chem. Abstracts 70, #71085N (1969), abst. of South African Pat. 67 06,464, June 5, 1968.

SHEP K. ROSE, Primary Examiner

U.S. Cl. X.R.

424—244, 250, 267